(12) United States Patent (10) Patent No.: US 9,092,600 B2
Scavezze et al. (45) Date of Patent: Jul. 28, 2015

(54) USER AUTHENTICATION ON AUGMENTED REALITY DISPLAY DEVICE

(71) Applicant: Microsoft Technology Licensing, LLC, Redmond, WA (US)

(72) Inventors: Mike Scavezze, Bellevue, WA (US); Jason Scott, Kirkland, WA (US); Jonathan Steed, Redmond, WA (US); Ian McIntyre, Redmond, WA (US); Aaron Krauss, Snoqualmie, WA (US); Daniel McCulloch, Kirkland, WA (US); Stephen Latta, Seattle, WA (US); Kevin Geisner, Mercer Island, WA (US); Brian Mount, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 13/669,255

(22) Filed: Nov. 5, 2012

(65) Prior Publication Data

US 2014/0125574 A1 May 8, 2014

(51) Int. Cl.
*G06F 21/31* (2013.01)
*G06F 21/34* (2013.01)
*G06F 21/36* (2013.01)

(52) U.S. Cl.
CPC .............. *G06F 21/31* (2013.01); *G06F 21/34* (2013.01); *G06F 21/36* (2013.01)

(58) Field of Classification Search
USPC .......................................... 345/7–9, 156–184
See application file for complete search history.

(56) References Cited

U.S. PATENT DOCUMENTS

| | | | |
|---|---|---|---|
| 6,421,453 B1 | 7/2002 | Kanevsky et al. | |
| 6,735,695 B1 | 5/2004 | Gopalakrishnan et al. | |
| 2003/0076300 A1 | 4/2003 | Lauper et al. | |
| 2004/0069846 A1 | 4/2004 | Lambert | |
| 2008/0222710 A1* | 9/2008 | Blagsvedt et al. | 715/706 |
| 2008/0273764 A1 | 11/2008 | Scholl | |
| 2009/0102603 A1 | 4/2009 | Fein et al. | |
| 2009/0328169 A1 | 12/2009 | Hutchison et al. | |
| 2010/0199347 A1* | 8/2010 | Aoki et al. | 715/771 |

(Continued)

OTHER PUBLICATIONS

De Luca, Alexander, et al. "Eyepass-Eye-Stroke Authentication for Public Terminals." CHI'08 Extended Abstracts on Human Factors in Computing Systems. ACM, Apr. 2008, 6 pages.

(Continued)

*Primary Examiner* — Ryan A Lubit
(74) *Attorney, Agent, or Firm* — Julie Kane Akhter; Danielle Johnston-Holmes; Micky Minhas

(57) ABSTRACT

Embodiments are disclosed that relate to authenticating a user of a display device. For example, one disclosed embodiment includes displaying one or more virtual images on the display device, wherein the one or more virtual images include a set of augmented reality features. The method further includes identifying one or more movements of the user via data received from a sensor of the display device, and comparing the identified movements of the user to a predefined set of authentication information for the user that links user authentication to a predefined order of the augmented reality features. If the identified movements indicate that the user selected the augmented reality features in the predefined order, then the user is authenticated, and if the identified movements indicate that the user did not select the augmented reality features in the predefined order, then the user is not authenticated.

20 Claims, 6 Drawing Sheets

(56) References Cited

U.S. PATENT DOCUMENTS

| | | | |
|---|---|---|---|
| 2010/0205667 A1 | 8/2010 | Anderson et al. | |
| 2010/0225443 A1 | 9/2010 | Bayram et al. | |
| 2011/0221670 A1* | 9/2011 | King et al. | 345/8 |
| 2012/0218301 A1 | 8/2012 | Miller | |
| 2012/0243729 A1 | 9/2012 | Pasquero | |
| 2013/0318572 A1* | 11/2013 | Singh et al. | 726/4 |

OTHER PUBLICATIONS

Forget, Alain et al., "Shoulder-Surfing Resistance with Eye-Gaze Entry in Cued-Recall Graphical Passwords," Proceedings of the SIGCHI Conference on Human Factors in Computing Systems. ACM, Apr. 2010, 4 pages.

Kumar, Manu, et al. "Reducing Shoulder-Surfing by Using Gaze-Based Password Entry", Proceedings of the 3rd Symposium on Usable Privacy and Security ACM, Jul. 2007, 7 pages.

Mauney, Daniel W. et al., "Small-Screen Interfaces", HCI Beyond the GUI—Design for Haptic, Speech, Olfactory and Other Nontraditional Interfaces, Elsevier, Dec. 31, 2008, pp. 352-354.

Suo, Xiaoyuan et al., "Graphical Passwords: A Survey", 21st Annual Computer Security Applications Conference, Dec. 2005, 10 pages.

Khare, et al., "A Collaborative Augmented Reality System Based on Real Time Hand Gesture Recognition", Retrieved at https://globaljournals.org/GJCST_Volume11/8-A-Collaborative-Augmented-Reality-System.pdf, Proceeding: Global Journal of Computer Science and Technology, vol. 11, Issue 23 Version 1.0, Dec. 2011, pp. 6.

Poh, et al., "Hybrid Biometric Person Authentication Using Face and Voice Features", Retrieved at <<http://citeseerx.ist.psu.edu/viewdoc/download?doi=10.1.1.4.5699&rep=rep1&,type=pdf>>, AVBPA: Proceedings of the Third International Conference on Audio- and Video-Based Biometric Person Authentication, Jun. 2001, pp. 348-353.

Maynard, et al., "Biometric Signature ID", Retrieved at <<http://www.biosig-id.com/biometric-signature-id-to-present-at-the-4th-international-conference-on-emerging-technologies-for-online-learning-et4ol-sloan-and-merlot-symposium/>>, Retrieved Date: Mar. 15, 2012, pp. 3.

"Search Report Issued in European Patent Application No. 13198218.3", Mailed Date: Apr. 28, 2014, Filed Date: Dec. 18, 2013, 9 Pages.

"Method for Access Control via Gestural Verification", An IBM Technical Disclosure Bulletin, vol. 36, Issue 9B, Sep. 1993, pp. 487-488.

* cited by examiner

USER AUTHENTICATION ON AUGMENTED REALITY DISPLAY DEVICE

BACKGROUND

In order to access a restricted feature, such as a device, specific program, application, data, web site, etc., a computing device user may be prompted to enter a password in order to authenticate that the user has permission to access the restricted feature. Such passwords frequently include a series of letters and/or numbers that the user may enter on a keypad. Further, authentication may be performed via biometric data, such as fingerprint scans, retinal scans, etc.

SUMMARY

Embodiments for authenticating a user of a display device are disclosed. For example, one disclosed embodiment provides a method including displaying one or more virtual images on the display device, wherein the one or more virtual images comprises a set of augmented reality features. The method further includes identifying one or more movements of the user via data received from a sensor of the display device, and comparing the identified movements of the user to a predefined set of authentication information for the user that links user authentication to a predefined order of the augmented reality features. If the identified movements indicate that the user selected the augmented reality features in the predefined order, then the user is authenticated, and if the identified movements indicate that the user did not select the augmented reality features in the predefined order, then the user is not authenticated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Head-mounted display (HMD) devices may be used to present an augmented reality view of a background scene to a user. Further, HMD devices may allow the user to access a variety of programs, data, and other such resources. In order to grant the user access to restricted resources, or to ensure that the user has permission to use the HMD device, the user may be authenticated by inputs received via one or more input mechanisms of the HMD device in response to augmented reality images displayed by the HMD device.

Figure 1:
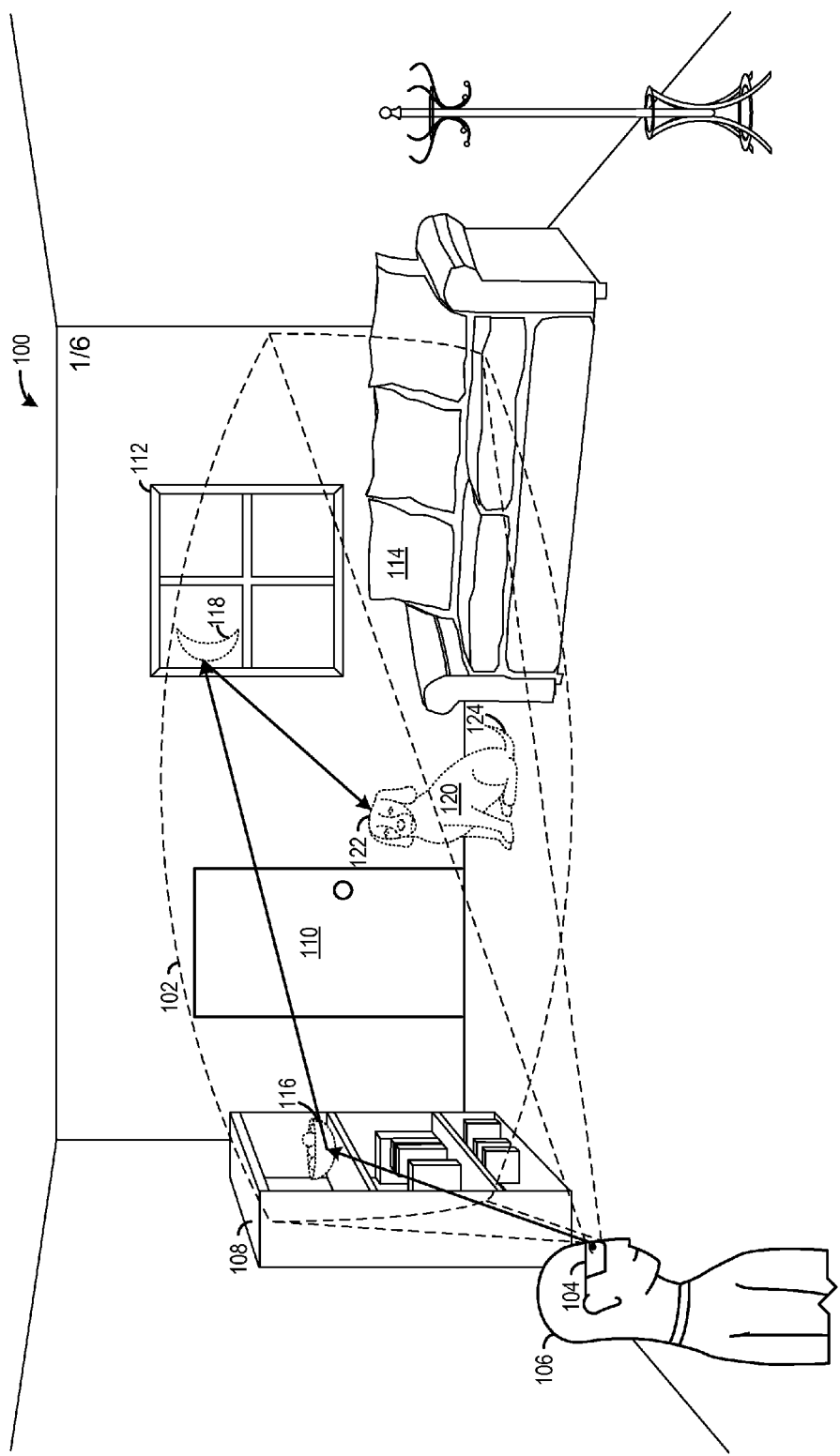
FIG. 1 shows a schematic depiction of an example use environment for an embodiment of a display device according to the present disclosure.

Prior to discussing these embodiments in detail, a non-limiting use scenario is described with reference to FIG. 1. More particularly, FIG. 1 illustrates an example embodiment of a use environment for an embodiment of a head-mounted display device 104, wherein environment 100 takes the form of a living room. A user 106 is viewing the living room through head-mounted display device 104. FIG. 1 also depicts a user field of view 102 comprising a portion of the environment viewable through the display device 104, and thus the portion of the environment that may be augmented with images displayed via the display device 104. In some embodiments, the user field of view 102 may be substantially coextensive with the user's actual field of vision, while in other embodiments the user field of view 102 may occupy a lesser portion of the user's actual field of vision.

As will be described in greater detail below, display device 104 may comprise one or more outwardly facing image sensors (e.g., two-dimensional cameras and/or depth cameras) configured to acquire image data (e.g. color/grayscale images, depth images/point cloud data, etc.) representing user authentication environment 100 as the user navigates the environment. This image data may be used to obtain information regarding the layout of the environment (e.g., three-dimensional surface map, etc.) and objects contained therein, such as bookcase 108, door, 110, window 112, and sofa 114.

Display device 104 may overlay one or more virtual images over real objects in the user field of view 102. Example virtual objects depicted in FIG. 1 include a bowl 116, a moon 118, and a dog 120. The virtual objects may be displayed in three-dimensions such that the objects appear at different depths to user 106 within the user field of view 102. The virtual objects displayed by display device 104 may be visible only to user 106, and may move as user 106 moves, or may remain in a set location regardless of movement of user 106.

According to embodiments disclosed herein, augmented reality images displayed through display device 104, potentially in combination with information regarding use environment 100, may be used to authenticate user 106 on display device 104. For example, the virtual objects described above may be displayed to user 106 to provide a set of augmented reality features that user 106 may select in a predefined order. If user 106 selects the augmented features in the predefined order, the user may be authenticated, thereby allowing the user to access restricted resources. The augmented reality features may include any suitable feature, including but not limited to virtual object features, 3-dimensional holograms, 2-dimensional holograms, sounds, virtual movements, vibrations, and also may include real object features in the field of view of the user. For example, augmented reality features displayed to user 106 in the example of FIG. 1 include a virtual bowl 116 displayed as being on a real shelf of bookcase 108, a virtual moon 118, and a virtual dog 120 having a head 122 and tail 124 visible to the user.

User 106 may select the augmented reality features in any suitable manner detectable by display device 104. For example, user 106 may select an augmented reality feature by gazing at the selected augmented reality feature, wherein a gaze direction may be detected by one or more eye tracking sensors. In another example, user 106 may select an augmented reality feature by moving his or her head, hand, entire body, etc., to or towards the augmented reality feature, as detected by inertial motion sensors and or image sensors. A user also may issue voice commands detected by one or more microphones. Additional details regarding detecting user input commands via sensors of display device 104 are discussed below with respect to FIGS. 3-4.

Selection of an augmented reality feature may be detected and determined based on user 106 performing a movement or command associated with that augmented reality feature. The movement may include the user simply looking at or moving toward the augmented reality feature. Further, in some embodiments, the movement may also include the user looking at the augmented reality feature for a predetermined amount of time, the user looking at the augmented reality feature while performing a specific movement or issuing a specific audio command, and/or other suitable mechanisms for indicating selection of the augmented reality feature. Additionally, in some embodiments, specific inputs may be linked to specific geographic locations, specific orientations of the HMD device at a specified location, etc.

The predefined order in which the augmented reality features are selected by the user may be determined in any suitable manner. For example, in an initial authentication passcode setup session, the user may determine an identity of the features, and also order in which the features are to be selected in an authentication process. In another example, display device 104 may determine the identity of and order in which the augmented reality features are to be selected, and may notify the user of which order to select the augmented reality features.

In the example depicted in FIG. 1, user 106 first selects virtual bowl 116, then virtual moon 118, and then the head 122 of dog 120. To determine if the user has selected the correct augmented reality features in the predefined order, the movements of user (including eye and body movements), and potentially other information (e.g. voice commands, location, and/or orientation of the user) may be detected via sensors of the display device and compared to user authentication information that links user authentication to the specific order in which the augmented reality features are to be selected.

In some embodiments, the augmented reality features may be displayed to the user in a same or similar manner each authentication session. In other embodiments, the augmented reality features may be displayed to the user differently between user authentication sessions. For example, in some embodiments, a different overall set of augmented reality features containing the selected features may be displayed in different user authentication sessions. In another example, the same set of augmented reality features may be displayed, but in different locations, in different authentication sessions. In either case, displaying augmented reality features in different manners during different authentication sessions may help to prevent outside observers from detecting patterns of authentication motions performed by a user, and therefore may help to preserve the confidential nature of the sequence of augmented reality features selected.

Further, a number of and/or appearance of augmented reality features displayed to the user may change depending on user location or other parameters. For example, if it is determined that the user is being authenticated at his or her home or other private location (e.g. via GPS data, image data, and/or other display device sensor data), a simpler passcode image (e.g. with fewer total augmented reality features) may be displayed, and/or a lower confidence level regarding whether the user input matched the authentication data may be permitted for authentication, than when the user is in more public locations.

Figure 2:
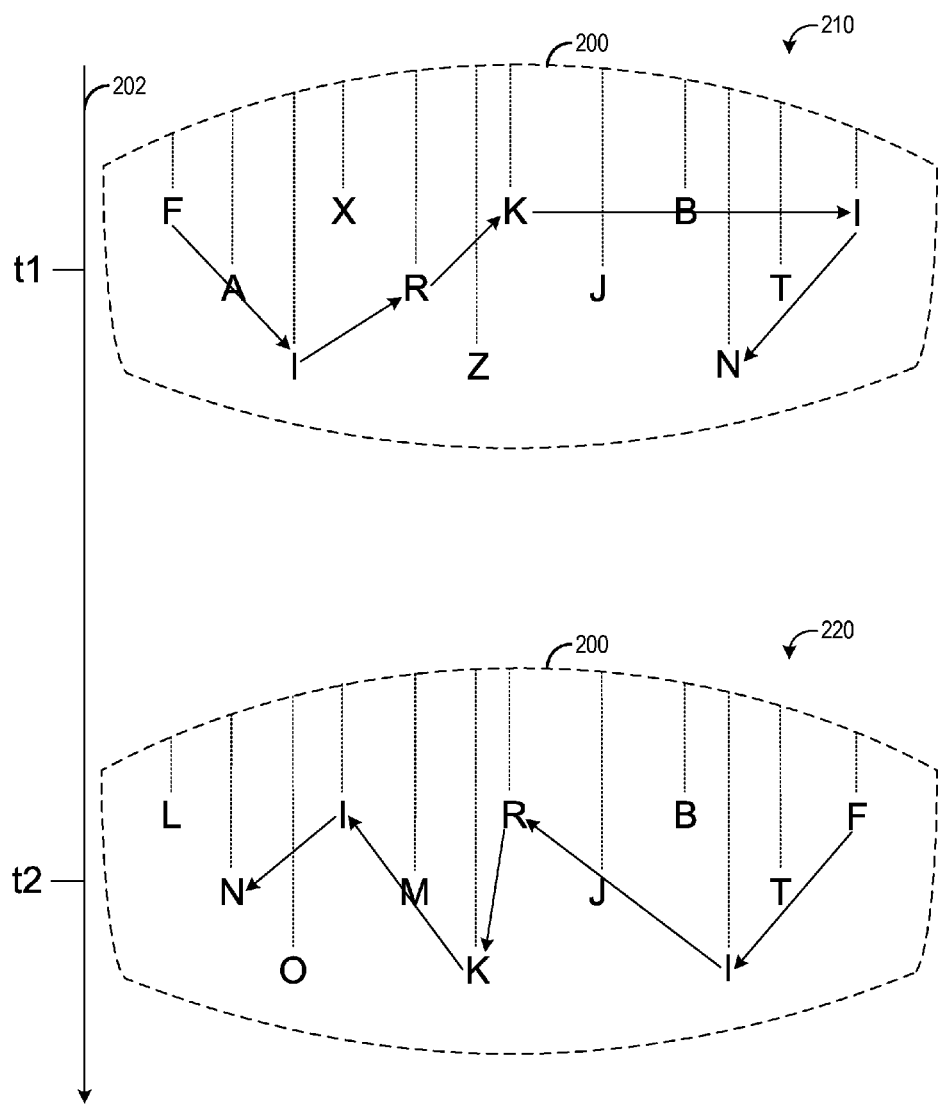
FIG. 2 schematically shows two example embodiments of sets of augmented reality features.

FIG. 2 illustrates an example embodiment of two sets of augmented reality features that may be displayed during two separate authentication sessions. The augmented reality features are displayed to a user (not shown in FIG. 2) via a display device, as described above. A timeline 202 is also depicted to illustrate the relative timing of the separate authentication sessions.

At time t1, a first set of augmented reality features 210 is displayed to the user. The first set of augmented reality features 210 comprises a set of letters displayed at falling down the screen slowly at various positions within the user field of view 200. As depicted in FIG. 2, the user selects a set of letters in a predefined order to spell out the word FIRKIN. If it the authentication information indicates that the user password is FIRKIN, the user is authenticated.

Next, at time t2, a second authentication session is initiated in which a second set of augmented reality features 220 is displayed to the user via the user field of view 200. In the second set of augmented reality features 220, the letters and/or locations of the letters may be different than in the first set of augmented reality features 210, but still allow selection the word FIRKIN via a different set of motions than with the first set of features 210. While the user selects the same combination of characters in both authentication sessions, the movements of the user will appear to be different to an outside observer.

Figure 3:
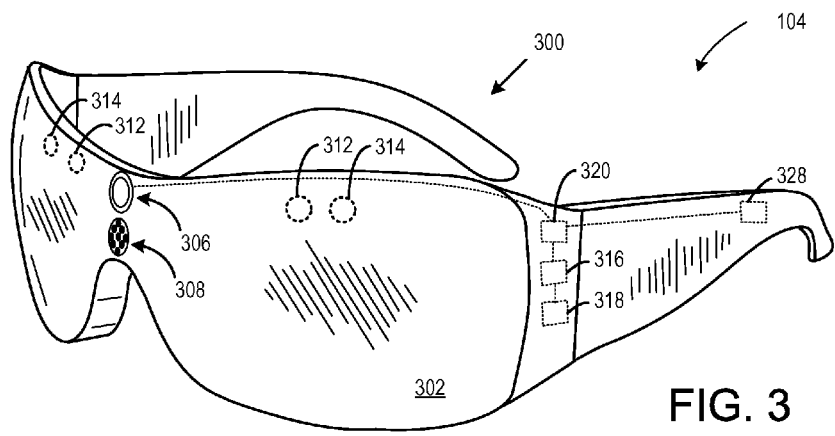
FIG. 3 schematically shows an example embodiment of a display device.
Figure 4:
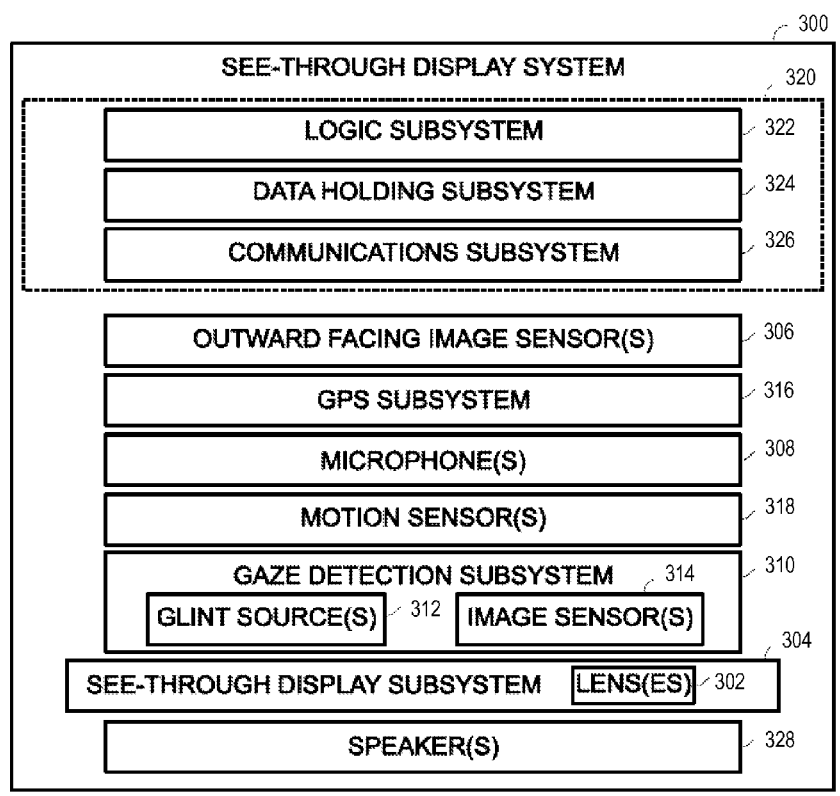
FIG. 4 is a block diagram of the display device of FIG. 3.

As mentioned above, a user authentication process may be performed by any suitable computing device, including but not limited to a display device. A display device according to the present disclosure may take any suitable form, including but not limited to HMD devices such as the head-mounted display device 104 of FIG. 1. FIG. 3 shows an example embodiment of a display system 300, and FIG. 4 shows a block diagram of the display system 300.

Display system 300 comprises one or more lenses 302 that form a part of a display subsystem 304, such that images may be projected onto lenses 302, or produced by image-producing elements (e.g. transparent OLED displays) incorporated into lenses 302. Display system 300 further comprises one or more outward-facing image sensors 306 configured to acquire images of a background scene and/or physical space being viewed by a user, and may include one or more microphones 308 configured to detect sounds, such as voice commands from a user. Outward-facing image sensors 306 may include one or more depth sensors and/or one or more two-dimensional image sensors.

Display system 300 may further comprise a gaze detection subsystem 310 configured to detect a direction of gaze of each eye of a user, as described above. Gaze detection subsystem 310 may be configured to determine gaze directions of each of a user's eyes in any suitable manner. For example, in the depicted embodiment, gaze detection subsystem 310 comprises one or more glint sources 312, such as infrared light sources, configured to cause a glint of light to reflect from each eyeball of a user, and one or more image sensors 314, such as inward-facing sensors, configured to capture an image of each eyeball of the user. Changes in the glints from the user's eyeballs as determined from image data gathered via the image sensor(s) 314 may be used to determine a direction of gaze. Further, a location at which gaze lines projected from the user's eyes intersect the external display may be used to determine an object at which the user is gazing (e.g. a displayed virtual object and/or real background object). Gaze detection subsystem 310 may have any suitable number and arrangement of light sources and image sensors.

Display system 300 may further comprise additional sensors. For example, display system 300 may comprise a global positioning (GPS) subsystem 316 to allow a location of the display system 300 to be determined. This may allow a user of display system 300 to utilize different passwords at different locations, which may allow a desired level of security to vary depending upon the device location.

Display system 300 further may include one or more motion sensors 318 to detect movements of a user's head when the user is wearing display system 300. Motion data may be used, potentially along with eye-tracking glint data and outward-facing image data, for gaze detection, as well as for image stabilization to help correct for blur in images from the outward-facing image sensor(s) 306. The use of motion data may allow changes in gaze location to be tracked even if image data from outward-facing image sensor(s) 306 cannot be resolved. Likewise, motion sensors 318, as well as microphone(s) 308 and gaze detection subsystem 310, also may be employed as user input devices, such that a user may interact with the display system 300 via gestures of the eye, neck and/or head, as well as via verbal commands. It will be understood that sensors illustrated in FIGS. 3 and 4 are shown for the purpose of example and are not intended to be limiting in any manner, as any other suitable sensors and/or combination of sensors may be utilized.

Display system 300 further comprises a controller 320 having a logic subsystem 322 and a data holding subsystem 324 (otherwise referred to as a storage system) in communication with the sensors, gaze detection subsystem 310, and display subsystem 304. Data holding subsystem 324 comprises instructions stored thereon that are executable by logic subsystem 322, for example, to receive and interpret inputs from the sensors, to identify movements of a user, to compare the identified movements to authentication information to determine if the user selected the augmented reality features in a predefined order, and to authenticate the user, among other tasks.

It will be appreciated that the depicted display devices 104, 300 are described for the purpose of example, and thus are not meant to be limiting. It is to be understood that the display device may include additional and/or alternative sensors, cameras, microphones, input devices, output devices, etc. than those shown without departing from the scope of this disclosure. Further, the physical configuration of a display device and its various sensors and subcomponents may take a variety of different forms without departing from the scope of this disclosure.

Figure 5:
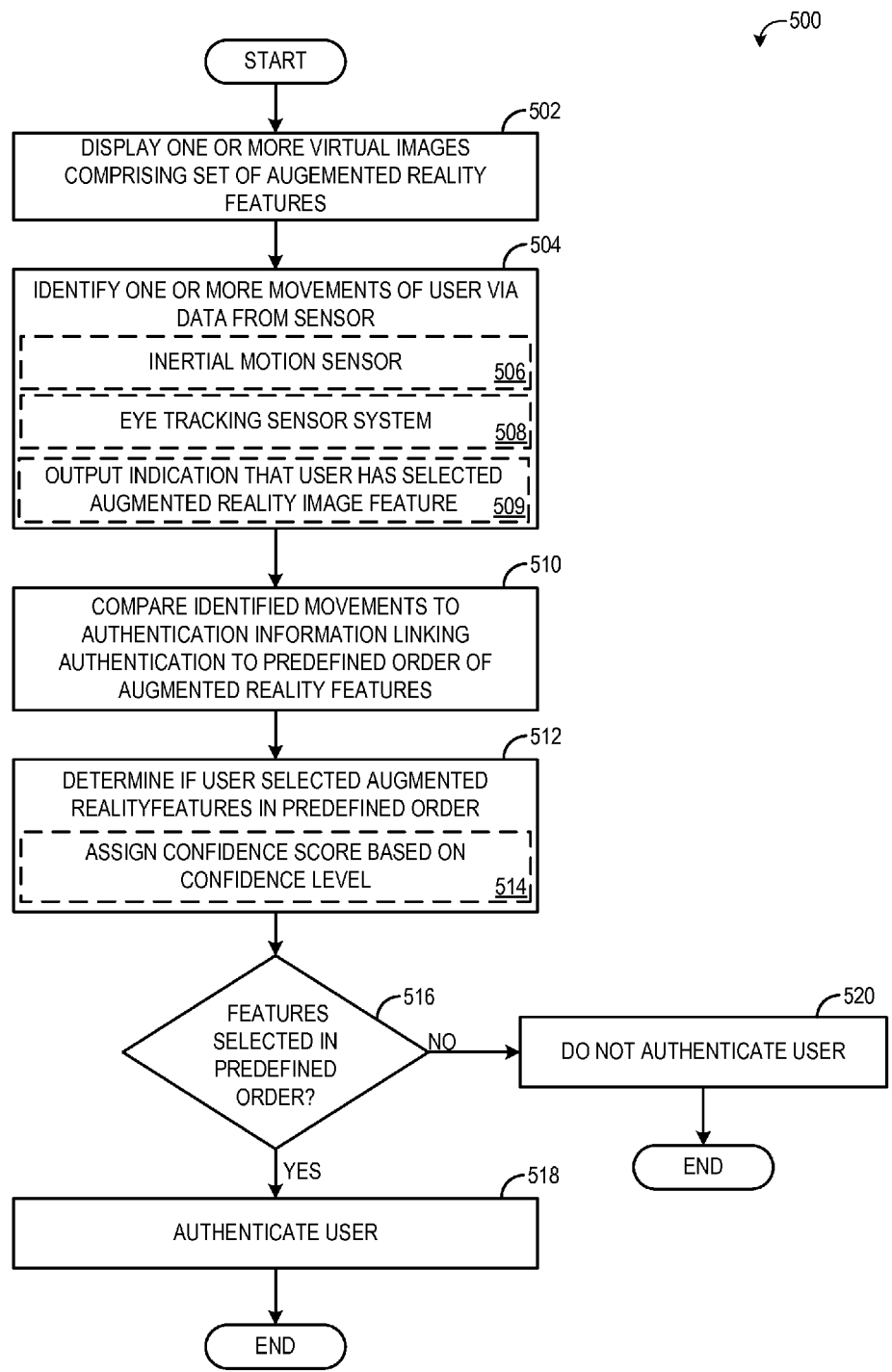
FIG. 5 is a flow chart illustrating a method for authenticating a user according to an embodiment of the present disclosure.

FIG. 5 shows a flow diagram depicting an embodiment of a method 500 for authenticating a user of a display device, such as head-mounted display device 104 described above. Briefly, method 500 presents one or more virtual images or other augmented reality features to a user during an authentication session in order to authenticate the user. Once authenticated, the user may be granted access to one or more restricted devices, programs, applications, etc. The authentication session may be initiated via any suitable input, such the user powering on the display device, requesting permission to start a program or application, requesting permission to view a web site, etc.

At 502, method 500 includes displaying one or more virtual images comprising a set of augmented reality features. The set of augmented reality features may include any suitable features of the virtual images and/or real objects. For example, the augmented reality features may include a specific 3D real or virtual object selected by the user, an image depicting a specific object or person (as opposed to a specific image), and/or a 3D real or virtual object with a specific property. Further, the features also may include sounds or other augmented reality environment aspects. Augmented reality features may be presented in any suitable manner. For example, the augmented reality features may be displayed in a pre-defined order, random order, algorithmically changed order between different authentication sessions, etc.

At 504, method 500 comprises identifying one or more movements of the user via data received from a sensor. The sensor data may be received from any suitable sensor, including but not limited to an inertial motion sensor 506, and/or an eye tracking sensor system 508. Further, sensors external to the display device may also be used to identify the movements of the user. For example, the user may draw a picture on the screen of an external device (such as a tablet), and the tablet may detect the movement of the user's hand and communicate the movements to the see-though display device. In another example, a remote service, e.g. accessible via a web server, may be used as an input device. For example, the display device may query the state of a web service, and if the web service is unreachable or returns a "do not admit" message, then the user may not be authenticated. The identified movements may be used to determine an identity and order of augmented reality features selected by the user. Further, as the user inputs movements to select the augmented reality features, if an identified movement matches a movement associated with an augmented reality feature, then method 509 may comprise outputting an indication that the user selected the augmented reality feature.

At 510, method 500 includes comparing the identified movements to authentication information linking user authentication to a predefined order of the augmented reality features. The authentication information may be stored locally on the display device, or may be stored remotely and be accessible via a remote service.

At 512, method 500 includes determining if the user selected the augmented reality features in the predefined order. As explained above, the identified movements of the user may be used to determine the identity of an order of augmented reality features selected by the user. In some embodiments, as indicated at 514, a confidence score may be assigned to the identified movements based on a level of confidence that the user actually selected the augmented reality features in the predefined order. The confidence score may reflect a certainty that the identified movements match the expected movements, and may be a function of various other factors, including but not limited to a sensor's ability to detect the movements.

The confidence score may be compared to a threshold confidence score value in order to determine whether to authenticate the user. If the confidence score is greater than the threshold and the augmented reality features were selected in the correct order, as indicated at 516, the display device may authenticate the user, as indicated at 518. The threshold may be a fixed value that does not change, or it may vary depending on conditions of the authentication session, such as user location and/or biometric signatures. On the other hand, if the augmented reality features were not selected in the predefined order (or if the confidence score did not meet the threshold, which may be considered as not selecting the features in the predefined order), then method 500 comprises, at 520, not authenticating the user.

In the example described above with respect to FIG. 5, the authentication is based on a single input mechanism. In embodiments where combinations of multiple input mechanisms may be used to authenticate the user, the confidence score threshold used to authenticate the user may vary depending upon how many input mechanisms were used. For example, where a single input mechanism is used, a higher confidence score threshold may be applied than where multiple inputs mechanisms are used.

Figure 6:
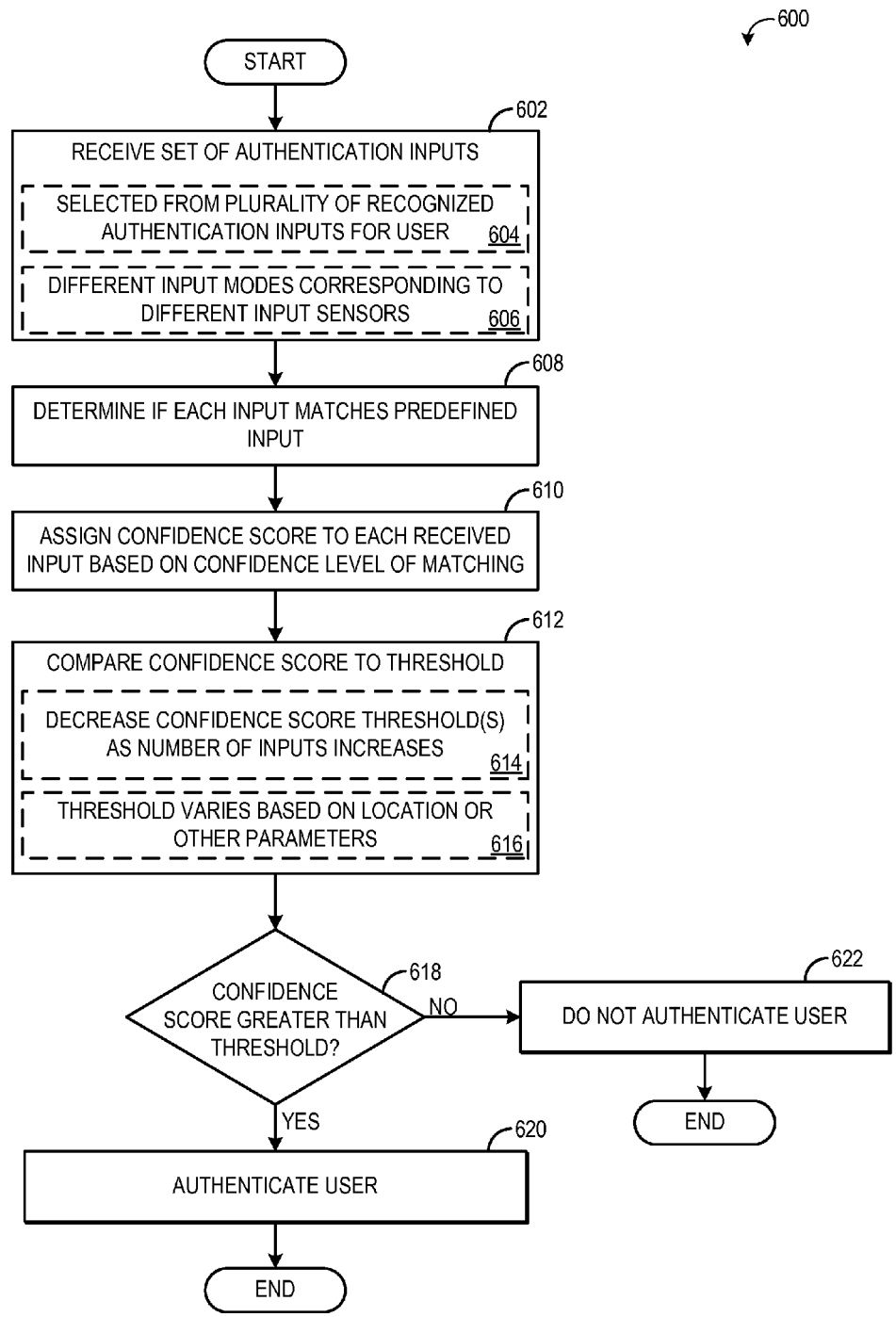
FIG. 6 is a flow chart illustrating a method for authenticating a user according to another embodiment of the present disclosure.

FIG. 6 shows a flow chart illustrating an embodiment of a method 600 for authenticating a user based on a user-variable number of authentication inputs. As used herein, the term authentication input may refer to any user input detected by any sensor of the display device that may be compared to authentication information linking user movements to augmented reality features to authenticate the user. Examples of authentication inputs include, but are not limited to, selection of virtual objects via eye movement, selection of virtual objects via body movements, voice command, and assuming a particular orientation or location.

At 602, method 600 includes receiving a set of authentication inputs. The set of authentication inputs may be selected from a plurality of recognized authentication inputs for the user, as indicated at 604, wherein the plurality of recognized inputs correspond to inputs made via different sensors. As a more specific example, the plurality of recognized inputs may include eye-tracking inputs, head tracking inputs, arm gesture inputs, and/or user biometric information (e.g. a user's interpupil distance (IPD), gait, height, etc.), and the set received may include eye-tracking input data followed by head motion input data.

In some embodiments, one or more authentication inputs may be associated with a physical location (e.g. as detected via GPS and/or image data) and/or specific orientation (e.g. as detected by the presence of a known physical object (e.g. a poster) at a predetermined location in the background viewable through the display device), such that the authentication input may be successfully performed only when the user is at the physical location and/or in the orientation. Yet other examples may involve a user making inputs that are not in response to a displayed augmented reality image. For example, a user may draw a specific pattern using his or her eyes or hands that is detected by the eye tracking and/or inertial motion and outward-facing image sensors, and/or may enter a voice command. As another example, the presence of other users may be detected, and user authentication may be based on a number of, identity of, and/or other characteristic of the detected other users. It will be understood that these input modes are presented for the purpose of example, and are not intended to be limiting in any manner.

Continuing, at 608, method 600 includes determining if each authentication input matches a corresponding predefined authentication input. Further, as indicated at 610, a confidence score may be assigned to each received authentication input, where the confidence scores reflect a level of confidence that the received authentication input matches the predefined authentication input.

At 612, the confidence score is compared to a threshold. For example, in some embodiments, the confidence scores for each authentication input may be combined and compared to a threshold in aggregate. In other embodiments, each confidence score may be compared to a corresponding threshold individually. In either case, user may be authenticated where the confidence score meets a predetermined condition (e.g. equal to or greater) relative to the threshold.

By using a relatively greater number of authentication inputs, in some embodiments a user may be authenticated even where the confidence scores for all inputs do not meet the predetermined condition relative to the threshold scores for lesser numbers of inputs. As one non-limiting example, where three authentication inputs are entered by the user, a user may be authenticated where at least two confidence scores exceed individual confidence score thresholds. In contrast, the user may have to exceed all thresholds if authenticated via a lesser number of authentication inputs. Likewise, a combined confidence score threshold may be varied depending upon a number of input modes used to achieve a similar effect. Each of these examples may be considered non-limiting examples of changes in a confidence score threshold according to the present disclosure.

Thus, as indicated at 614, method 600 may comprise decreasing a confidence score threshold as the number of authentication inputs received by the display device increases. Likewise, method 600 also may comprise increasing the threshold as a number of authentication inputs decreases. It will be understood that the confidence score threshold(s) may be varied in any suitable manner, including but not limited to those described above.

As described above with regard to FIG. 5, in some embodiments the threshold for authenticating the user may vary based on user location or other parameters, as indicated at 616. For example, a first, greater number of authentication inputs may be used in a first, less secure location, while a second, lesser number of authentication inputs may be used in a second, more secure location. In another example, the number of authentication inputs may be the same in both locations, but the threshold may be higher for the less secure location than for the more secure location. Further, parameters other than location that may affect the threshold include user-designated security, such as the type of information being accessed, etc.

At 618, it is determined if the confidence score is greater than the threshold. If the confidence score is greater than the threshold, the user is authenticated at 620. On the other hand, if the confidence score is not greater than the threshold, the user is not authenticated at 622.

Thus, the embodiments described herein provide for user authentication via various inputs utilize particular features of the disclosed display devices. It will be understood that the inputs disclosed are non-limiting examples, and other inputs are possible. For example, user authentication inputs may also be entered using blink detection, object recognition (e.g., recognition of a specific object, such as a poster, building, piece of art, etc.), retinal scan, fingerprint detection, and/or other suitable input mechanisms.

Further, combinations of such inputs also may be used for authentication. For example, a user may look at a specific object (real or virtual) while tapping a particular rhythm with his or her finger on the display device, such that the image is detected by outward-facing image sensors and the tapping is detected via inertial motion sensors. As another example, the user's interpupil distance (IPD) may be measured by the display device as biometric data. This may be combined with a retinal scan, a set of predetermined gestures, and/or other inputs to authenticate the user.

In another example, one or more inputs used for authentication may change each time the user is authenticated, while remaining related to a particular category. An example user passcode including such inputs may comprise a definition of a category, such as "cartoony," "feathery," "related to babies," "object that is jumping," and "direction of soothing music," as non-limiting examples. To be authenticated, the user selects an object or otherwise performs an input that meets the definition of the selected category (e.g., that is cartoony, that has feathers, that relates to babies, that is moving up and down, moving his or her head towards a direction of from which music is heard) in order to be authenticated. While the specific nature of the input (selected object, direction in which the user faces, etc.) may change with each input, the category remains the same until changed by the user.

In some embodiments, authentication inputs are specific to individual users. In other embodiments, a same set of authentication inputs may be used by multiple users. For example, members of a user's family may be authorized to enter the user's authentication inputs, and the display device may be configured to recognize the inputs from each family member. Further, different permissions may be applied to each family member, based upon the family member identification as determined from image data, voice data, etc. In another example, a user may be authenticated via inputs made by multiple people. For example, if the authentication is used to grant access to confidential information, verification from another trusted person that oversees the information may be used along with the user's authentication input(s) to authenticate the user.

In some embodiments, the methods and processes described above may be tied to a computing system of one or more computing devices. In particular, such methods and processes may be implemented as a computer-application program or service, an application-programming interface (API), a library, and/or other computer-program product.

Figure 7:
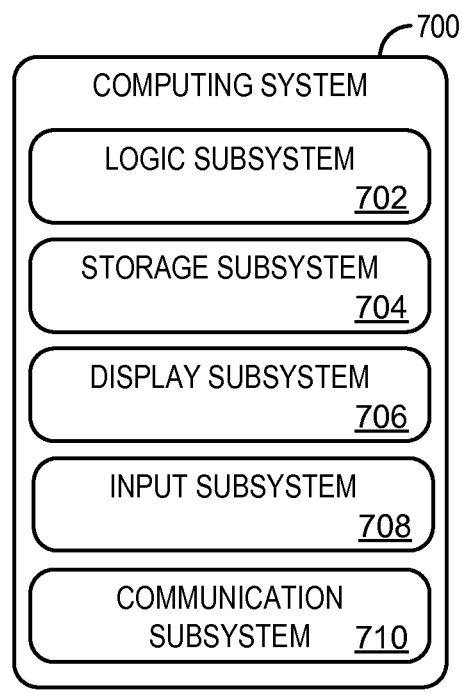
FIG. 7 schematically shows an example computing system.

FIG. 7 schematically shows a non-limiting embodiment of a computing system 700 that can enact one or more of the methods and processes described above. Display device 104 may be one non-limiting example of computing system 700. Computing system 700 is shown in simplified form. It will be understood that virtually any computer architecture may be used without departing from the scope of this disclosure. In different embodiments, computing system 700 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 704 includes one or more physical, non-transitory, devices configured to hold data and/or instructions executable by the logic subsystem to implement the methods and processes described herein. When such methods and processes are implemented, the state of storage subsystem 704 may be transformed—e.g., to hold different data.

Storage subsystem 704 may include removable media and/or built-in devices. Storage subsystem 704 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 702 and of storage subsystem 704 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The term "program" may be used to describe an aspect of computing system 700 implemented to perform a particular function. In some cases, a program may be instantiated via logic subsystem 702 executing instructions held by storage subsystem 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service" as used herein is an application program executable across multiple user sessions. A service may be available to one or more system components, programs, and/or other services. In some implementations, a service may run on one or more server-computing devices.

When included, display subsystem 706 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for authenticating a user of a computing system comprising a display device, comprising:
displaying one or more virtual images on the display device wherein a set of augmented reality features includes the one or more virtual images and one or more real objects in a field of view of the user;
identifying one or more movements of the user via data received from a sensor of the computing system;
comparing the identified movements of the user to a predefined set of authentication information for the user that links user authentication to a predefined order of the augmented reality features;
when the identified movements indicate that the user selected the augmented reality features in the predefined order, then authenticating the user; and
when the identified movements indicate that the user did not select the augmented reality features in the predefined order, then not authenticating the user.

2. The method of claim 1, wherein the sensor comprises an inertial motion sensor, and wherein the data comprises inertial motion data.

3. The method of claim 1, wherein the sensor comprises an eye tracking sensor system, and wherein the data comprises eye movement data.

4. The method of claim 1, wherein the predefined order of the augmented reality features is user-selected.

5. The method of claim 1, wherein the one or more virtual images are displayed in a similar location each time the user is authenticated.

6. The method of claim 1, wherein the one or more virtual images are displayed in a different location in different authentication sessions.

7. The method of claim 1, further comprising outputting an indication that the user has selected an augmented reality feature when an identified movement of the user matches a movement associated with the augmented reality feature.

8. The method of claim 1, further comprising determining a confidence score reflecting a level of confidence that the user selected augmented reality features in the predefined order.

9. The method of claim 8, further comprising, when the confidence score is greater than a threshold, then authenticating the user, and when the confidence score is less than the threshold, then not authenticating the user.

10. The method of claim 9, wherein the threshold is based on a location of the user.

11. The method of claim 9, wherein the threshold varies based on a number of augmented reality features.

12. A method for authenticating a user of a head-mounted display device, the method comprising:
displaying one or more virtual images on the head-mounted display device, wherein a set of augmented reality features includes the one or more virtual images and one or more real objects in a field of view of the user;
identifying one or more movements of the user via a sensor of the head-mounted display device;
comparing the identified movements of the user to a predefined set of expected movements associated with a predefined order of the augmented reality features;
assigning a confidence score to the identified movements, the confidence score reflecting a level of confidence that the user selected the augmented reality features in the predefined order based on a difference between the identified movements and the set of expected movements;
when the confidence score is greater than a threshold, then authenticating the user; and
when the confidence score is not greater than the threshold, then not authenticating the user.

13. The method of claim 12, wherein the sensor comprises one or more of an inertial motion sensor and an eye tracking sensor, and wherein when the location of the virtual images changes during different authentication sessions, the expected movements change.

14. The method of claim 12, wherein the threshold is based on a location of the user, and further comprising applying different thresholds at different locations.

15. The method of claim 10, wherein the threshold is based on a determined ability of the sensor to identify the one or more movements of the user.

16. A computing system comprising:
a display device;
a processor; and
a storage device storing instructions executable by the processor to
display one or more virtual images on the display device, wherein a set of augmented reality features includes the one or more virtual images and one or more real objects in a field of view;
identify one or more movements of a user via data received from a sensor of the computing system;
compare the identified movements of the user to a predefined set of authentication information for the user that links user authentication to a predefined order of the augmented reality features;

when the identified movements indicate that the user selected the augmented reality features in the predefined order, then authenticate the user; and when the identified movements indicate that the user did not select the augmented reality features in the predefined order, then not authenticate the user.

17. The computing system of claim 16, wherein the sensor comprises an inertial motion sensor, and wherein the data comprises inertial motion data.

18. The computing system of claim 16, wherein the sensor comprises an eye tracking sensor system, and wherein the data comprises eye movement data.

19. The computing system of claim 16, wherein the instructions are executable to display the one or more virtual images in a similar location each time the user is authenticated.

20. The computing system of claim 16, wherein the instructions are executable to display the one or more virtual images in different locations in different authentication sessions.

* * * * *